United States Patent [19]

Morimoto et al.

[11] Patent Number: 4,757,424

[45] Date of Patent: Jul. 12, 1988

[54] ELECTRIC DOUBLE LAYER CAPACITOR

[75] Inventors: Takeshi Morimoto; Kazuya Hiratsuka; Yasuhiro Sanada; Hiroshi Aruga, all of Yokohama, Japan

[73] Assignees: Asahi Glass Company Ltd., Tokyo; Elna Company Ltd., Fujisawa, both of Japan

[21] Appl. No.: 99,019

[22] Filed: Sep. 21, 1987

[30] Foreign Application Priority Data

Sep. 26, 1986 [JP] Japan .................................. 61-226216

[51] Int. Cl.$^4$ ................................................ H01G 9/00
[52] U.S. Cl. ..................................................... 361/433
[58] Field of Search ......................................... 361/433

[56] References Cited

U.S. PATENT DOCUMENTS 1,709,427  4/1929  Bush ................................. 361/433 X
2,733,389  1/1956  Ellison .............................. 361/433
3,105,178  9/1963  Meyers ............................. 361/433 X
4,260,668  4/1981  Lecerf et al. ..................... 361/433 X
4,313,084  1/1982  Hosokawa et al. ............... 361/433 X
4,626,964  12/1986 Azuma et al. ...................... 361/433

Primary Examiner—Donald A. Griffin
Attorney, Agent, or Firm—Oblon, Fisher, Spivak, McClelland & Maier

[57] ABSTRACT

An electric double layer capacitor comprising a casing and polarizable electrodes and an electrolyte solution accommodated in the casing and utilizing an electric double layer formed by the interface of the electrolyte solution and the polarizable electrodes, characterized in that at least the portion of the casing which is in contact with the electrolyte solution at the anode side is made of an alloy steel consisting essentially of from 50 to 75.3% by weight of Fe, from 10.0 to 35.0% by weight of Cr, from 0 to 25.0% by weight of Ni, from 0.1 to 5.0% by weight of Mo and from 0.1 to 2.0% by weight of N.

3 Claims, 1 Drawing Sheet

ELECTRIC DOUBLE LAYER CAPACITOR

BACKGROUND OF THE INVENTION

1. Field of the Invention

The present invention relates to an electric double layer capacitor.

2. Discussion of the Background

The materials for the current collectors and for the casings for accommodating capacitor-constituting elements for electric double layer capacitors have been disclosed, for example, in Japanese Unexamined Patent Publications No. 44461/1975, No. 44464/1975, No. 206116/1983 and No. 263418/1985.

However, such electric double layer capacitors have problems such that when e.g. aluminum or stainless steel is used as the material for the current collectors or casings which are in contact with an electrolyte solution, such material partially undergoes dissolution without being anodized completely to a passive state. In addition, aluminum has less mechanical strength than conventional stainless steels and is not suitable for current collectors or casings. Likewise, when a valve metal such as titanium or niobium is used, corrosion due to the anodic dissolution takes place if the charging is conducted at a high voltage, and accordingly, the rating for the working voltage of the capacitor had to be set at a low level.

SUMMARY OF THE INVENTION

It is an object of the present invention to solve such problems which are specific to the material for the current collector or the casing for the electric double layer capacitor and to provide an electric double layer capacitor having excellent reliability for a long period of time with a minimum deterioration in the capacity even under a high temperature condition.

In order to solve the above-mentioned problems, the present invention provides an electric double layer capacitor comprising a casing and polarizable electrodes and an electrolyte solution accomodated in the casing and utilizing an electric double layer formed by the interface of the electrolyte solution and the polarizable electrodes, characterized in that at least the portion of the casing which is in contact with the electrolyte solution at the anode side is made of an alloy steel consisting essentially of from 50 to 75.3% by weight of Fe, from 10.0 to 35.0% by weight of Cr, from 0 to 25.0% by weight of Ni, from 0.1 to 5.0% by weight of Mo and from 0.1 to 2.0% by weight of N.

The capacitor of the present invention may further contain a current collector for the anode, which is made of the same alloy steel as defined above.

DETAILED DESCRIPTION OF THE PREFERRED EMBODIMENTS

Figure 1:
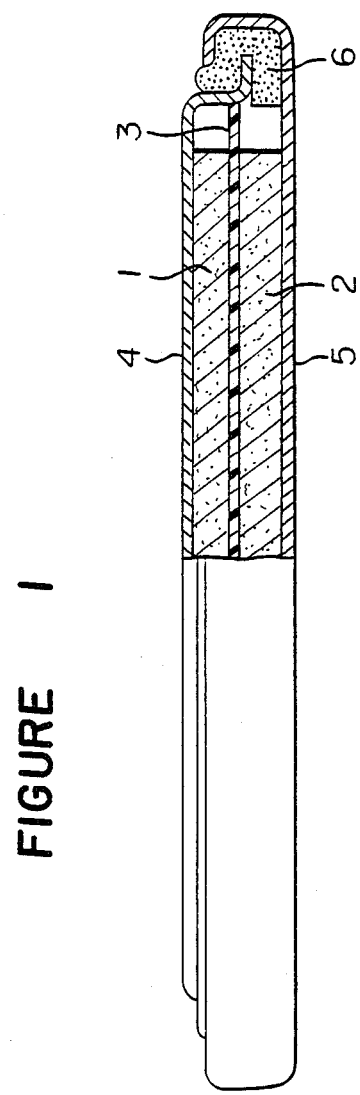
FIG. 1 is a partially cross sectional view of an embodiment of the electric double layer capacitor of the present invention.

The most important component in the alloy steel is nitrogen. Namely, the alloy steel, for example, a stainless steel, used in the present invention for the current collector and the casing of the capacitor, particularly for the portions thereof which are in contact with an electrolyte solution, contains from 0.1 to 2.0% by weight, preferably from 0.2 to 1.5% by weight, of nitrogen. If the nitrogen content is less than 0.1% by weight, the alloy steel is likely to undergo electrochemical dissolution, and it is likely that corrosion due to e.g. impurities in the electrolyte solution, particularly, pitting due to a trace amount of halogen, takes place. On the other hand, if the nitrogen content exceeds 2.0% by weight, it becomes difficult to uniformly melt or roll the alloy steel, and the mechanical strength tends to deteriorate. Among alloy steels having the above-mentioned composition, an alloy steel containing from 55.0 to 70.0% by weight of Fe, from 15.0 to 32.0% by weight of Cr, from 0.5 to 20.0% by weight of Ni and from 1.5 to 4.8% by weight of Mo is particularly preferred since it has excellent corrosion resistance.

The casing used for the electric double layer capacitor of the present invention may be prepared by suitably processing a thin sheet or a laminated sheet obtained by melting and rolling the alloy steel having the above-mentioned composition. As the current collector, a thin sheet or foil as in the case of the above casing, or a processed expanded mesh may be employed.

There is no particular restriction as to the electrolyte solution to be used in the present invention. An electrolyte solution commonly employed for electric double layer capacitors i.e. the one obtained by dissolving an electrochemically stable solute in a polar organic solvent such as propylene carbonate, butylene carbonate, sulfolane, $\gamma$-butyrolactone, acetonitrile, dimethylformamide or nitromethane at a concentration of from 0.1 to 3 mol/l, preferably from 0.5 to 1.5 mol/l, may be used.

As the solute for the electrolyte solution used in the present invention, it is preferred to use a salt obtained by a combination of a cation such as an alkali metal, an alkaline earth metal, ammonium, a tetraalkylammonium, a tetraalkylphosphonium, with an anion such as tetrafluoroboric acid, hexafluorophosphoric acid, perchloric acid, hexafluoroarsenic acid, tetrachloroaluminic acid or a perfluoroalkylsulfonic acid.

Among these salts, a tetrafluoroborate, hexafluorophosphate, hexafluoroarsenate, a perchlorate or a trifluoromethansulfonate of tetraalkylphosphonium or tetraalkylammonium is particularly preferred as the solute in view of the solubility to the solvent, the electric conductivity of the solution and the electrochemical stability.

There is no particular restriction as to the material for the polarizable electrodes to be used in the present invention. However, it is preferred to employ activated carbon powder or activated carbon fiber which is electrochemically inert to the electrolyte solution, and which has a large specific surface area.

Particularly, an electrode obtained by adding a binder such as polytetrafluoroethylene (PTFE) to activated carbon powder, rolling the mixture to form a sheet, and preferably subjecting the sheet to mono- or bi-axial stretching, is preferably employed, since it is superior in the capacity per unit volume, in the strength and in the reliability for a long period of time.

Such an electrode material is formed into a shape suitable for the capacitor. Between a pair of electrodes thus prepared, a porous separator is sandwiched, and then the above-mentioned electrolyte solution is impregnated or filled. The assembly is then sealed in a casing made of the alloy steel of the present invention to obtain an electric double layer capacitor.

As the porous separator, for instance, a non-woven fabric of polypropylene or a glass fiber-incorporated cloth, may be used. The separator usually has a thickness of from 50 to 200 μm, preferably from 100 to 50 μm.

Now, the present invention will be described in further detail with reference to Examples and Comparative Examples.

EXAMPLES 1 TO 5 AND COMPARATIVE EXAMPLES 1 TO 3

The Examples and Comparative Examples will be described in detail with reference to the attached drawing.

In each of the Examples of the present invention and the Comparative Examples, a unit cell (diameter: 20 mm, thickness 2.0 mm) of a coin-shaped electric double layer capacitor as shown in FIG. 1 was prepared as follows.

Firstly, 10% by weight of polytetrafluoroethylene was added to activated carbon powder (specific surface area: 2000 m$^2$/g), and the mixture was formed into a sheet by a wet-type kneading. The sheet thus obtained, was punched out to obtain disc-shaped polarizable electrodes 1 and 2 (diameter: 15 mm, thickness: 0.7 mm). These polarizable electrodes 1 and 2 facing to each other with a separator 3 of a non-woven fabric of polypropylene fiber interposed therebetween, were placed in a container comprising a cap 4 (at the anode side when charged) made of an alloy steel having the composition as identified in Table 1 and a can 5 (at the cathode side when charged) made of SUS304. Then, the predetermined electrolyte solution is injected in the unit cell so that the polarizable electrodes 1 and 2 and the separator 3 were adequately impregnated with this electrolyte solution. Then, the edges of the cap 4 and the can 5 were caulked with a polypropylene packing 6 (an insulating packing) interposed therebetween, for sealing and integration.

By using the unit cell of an electric double layer capacitor prepared as described above, the initial capacity (Fo) and the internal resistance upon application of a voltage of 2.8 V were measured with respect to each of cells containing various electrolyte solutions. Then, each cell was stored at 70° C. for 1000 hours while continuously applying a voltage of 2.8 V thereto, whereupon the capacity deterioration rate (%) from the initial capacity (Fo) was calculated.

The results of the measurements in Examples 1 to 5 and Comparative Examples 1 to 3 are shown in Table 1.

In Table 1, PC means propylene carbonate, SL means sulfolane, Et means an ethyl group, and Bu means a n-butyl group. The concentration of the electrolyte solution was 0.5 M/l in each of the Examples and the Comparative Examples.

TABLE 1

| | Composition (% by weight) | | | | | Electrolite solution (0.5 M/l) | Initial capacity (Fo) | Capacity deterioration rate (%) |
| --- | --- | --- | --- | --- | --- | --- | --- | --- |
| | N | Fe | Cr | Ni | Mo | | | |
| Examples | | | | | | | | |
| 1 | 0.3 | 56.7 | 22 | 16.5 | 4.5 | Bu$_4$PBF$_4$/PC | 2.20 | 5.8 |
| 2 | 0.3 | 56.7 | 22 | 16.5 | 4.5 | Bu$_4$PBF$_4$/SL:PC (2:1) | 2.10 | 3.7 |
| 3 | 0.3 | 56.7 | 22 | 16.5 | 4.5 | Et$_4$NBF$_4$/PC | 2.18 | 6.9 |
| 4 | 0.5 | 56.5 | 22 | 16.5 | 4.5 | Et$_4$PBF$_4$/PC | 2.28 | 8.2 |
| 5 | 0.2 | 65.0 | 20 | 12.8 | 2.0 | Et$_4$NBF$_4$/PC | 2.20 | 8.5 |
| Comparative Examples | | | | | | | | |
| 1 | 0.007 | 67.8 | 30.0 | 0.18 | 2.0 | Bu$_4$PBF$_4$/PC | 2.20 | 25.9 |
| 2 | 0.05 | 56.0 | 22 | 16.5 | 5.5 | Bu$_4$PBF$_4$/PC | 2.20 | 23.2 |
| 3 | 0 | 74.0 | 18.0 | 8.0 | 0 | Bu$_4$PBF$_4$/PC | 2.18 | 39.8 |

According to the present invention, at least the portions of the current collector and the casing which are in contact with an electrolyte solution, are made of an alloy steel containing from 0.1 to 2.0% by weight of nitrogen, whereby it is possible to obtain an electric double layer capacitor having excellent reliability for a long period of time with a minimum deterioration in the capacity even under a high temperature condition.

What is claimed is:

1. An electric double layer capacitor comprising a casing and polarizable electrodes and an electrolyte solution accommodated in the casing and utilizing an electric double layer formed by the interface of the electrolyte solution and the polarizable electrodes, characterized in that at least the portion of the casing which is in contact with the electrolyte solution at the anode side is made of an alloy steel consisting essentially of from 50 to 75.3% by weight of Fe, from 10.0 to 35.0% by weight of Cr, from 0 to 25.0% by weight of Ni, from 0.1 to 5.0% by weight of Mo and from 0.1 to 2.0% by weight of N.

2. The capacitor according to claim 1, which further contains a current collector for the anode, which is made of the same alloy steel as defined in claim 1.

3. The capacitor according to claim 1, wherein the casing consists of a metal can for the cathode and a cap for the anode, joined together with an insulating packing inerposed between them, and the cap is made of said alloy steel.

* * * * *